United States Patent [19]

Schaefer

[11] 4,175,275

[45] Nov. 20, 1979

[54] R/W ARM THAT PREVENTS CATASTROPHIC FAILURE

[75] Inventor: Donald W. Schaefer, Lakewood, Colo.

[73] Assignee: International Business Machines Corporation, Armonk, N.Y.

[21] Appl. No.: 908,490

[22] Filed: May 22, 1978

[51] Int. Cl.² .............................................. G11B 5/54
[52] U.S. Cl. ...................................... 360/104; 360/99; 360/130.1
[58] Field of Search ................................... 360/98–99, 360/86, 102–104, 105, 135, 122, 129–130

[56] References Cited

U.S. PATENT DOCUMENTS

| | | | |
|---|---|---|---|
| 3,579,213 | 5/1971 | Applequist | 360/105 X |
| 3,713,121 | 1/1973 | Fasano | 360/103 |
| 3,931,641 | 1/1976 | Watrous | 360/104 |
| 3,940,794 | 2/1976 | Griffiths et al. | 360/99 |
| 3,975,769 | 8/1976 | King | 360/99 |
| 3,990,109 | 11/1976 | Seifert | 360/105 X |

OTHER PUBLICATIONS

IBM/TDB, vol. 18, No. 10, Mar. 1976, p. 3366, "Two-Contour Knife and Head Combination for Flexible Disk Access", by McGinnis et al.
IBM/TDB, vol. 18, No. 12, May 1976, pp. 4126–4127, "Actuator for Magnetic Disk . . . ", by Wanek.
IBM/TDB, vol. 18, No. 10, Mar. 1976, pp. 3435–3436, "Disk File Actuator", by Dickie, et al.

Primary Examiner—John H. Wolff
Attorney, Agent, or Firm—James A. Pershon; Joscelyn C. Cockburn

[57] ABSTRACT

In a flexible magnetic disk file having one or more flexible disks mounted for rotation about a centrally located axis, data on a selected disk is transduced by a magnetic head seated on a fail-safe head arm support. The head arm support is a relatively flat elongated member mounted at one end to a carriage assembly. The head arm support has a smooth contour with relatively sharp edges about its periphery and a spherical enclosure seated on its free end. The head arm support is tapered, at a predetermined angle from the rigidly mounted end towards the free end. The angle of taper allows for automatic ejection of the head arm support from the disk file during inadvertent closure of the disk file. The relatively sharp edges allow the head arm support to open a closed disk file.

4 Claims, 6 Drawing Figures

R/W ARM THAT PREVENTS CATASTROPHIC FAILURE

CROSS-REFERENCE TO RELATED APPLICATION

The following co-pending patent application discloses related subject matter: application Ser. No. 908,494, filed May 22, 1978, by R. C. Bauck et al entitled "ARTICULATED HEAD ARM."

BACKGROUND OF THE INVENTION

1. Field Of The Invention

The present invention relates to random access storage devices and, more particularly, to such devices using flexible magnetic disks with noncontact magnetic heads for reading and/or writing magnetic data on a selected disk. Still, more particularly, the invention is directed to the head arm assembly which supports and positions the magnetic head relative to the oxide surface of the selected disk.

2. Prior Art

The use of a head arm assembly for supporting and positioning a magnetic head so as to access data from a track on a selected disk of a multi-disk rotating mass storage system is well known in the prior art. Conventional mass storage systems consist of a stack of rotating member disks and an accessing apparatus. The stack of disks is usually fixed or clamped at the midpoint to a tubular member. The tubular member and disks are mounted to the rotating shaft of a motor for rotation therewith. The motor is usually mounted to a support frame. At least one reference plate is securely mounted on the motor shaft on the tubular member for rotation with the stack of disks. The reference plate is positioned to be in axial alignment with the accessing apparatus when said apparatus is in an initial or home position.

The accessing apparatus includes a positioning apparatus which may be a voice coil motor, a linear actuator, or a linear motor. The positioning apparatus rides on a member or rail which is parallel to the axis of rotation of the disk file and positions the magnetic head axially so as to access any disk in the disk file. The positioning apparatus is fitted with a radial member or carriage which positions the magnetic head radially so as to access any desired track on a selected disk. The radial member is fitted with a head arm support. The magnetic transducer or head is seated on the head arm support. The direction of travel of the carriage and its attachment (i.e., the head arm support and magnetic head) is orthogonal to the axis of rotation of the disk file. The orientation between the rotating disk file and the associated accessing apparatus may be vertical or horizontal. In order to allow access into the disk pack conventional means, for example, vacuum or partitioning blades are used to open the pack between two selected disks. The magnetic head is then inserted in the open and transduces (i.e., read and/or write) data on a selected track on one of the two disks. A more detailed discussion of the aforementioned type of flexible disk storage system is described in U.S. Pat. No. 3,940,794 issued to Donald E. Griffiths et al and assigned to the assignee of the present invention.

In order to improve the accessibility and reliability of conventional random access flexible disk devices, several attempts have been made, in the prior art, to improve the head arm support or the mechanism which splits and partitions the pack.

In one attempt a random access memory with ultra thin rotating flexible magnetic disks is stabilized while being partitioned by an air foil blade. The air foil blade is a hollow structure with a contour of varying cross-sectional areas extending from the tip, which is first inserted into a pack, to the opposite end which is mounted to a carriage assembly. Due to the varying contour of the blade it operates as an air foil. By thrusting the blade into the rotating disks at a selected interface, the disks are separated into discretely rotating segments which diverge and converge about the blade to form a sizeable opening suitable for transducing access. Pressurized air which is emitted from the air foil blade further stabilizes the opening. A more detailed description of the aforementioned blade is given in U.S. Pat. No. 3,852,820.

In still another attempt, the magnetic transducer of a flexible disk file is mounted on an access arm which is blunt on one side edge and sharp on the other side edge and increases in thickness gradually from the sharp edge to the blunt edges where the maximum thickness occurs. A magnetic transducer is positioned adjacent the blunt edge and in from the tip of the access arm. When the arm is inserted into the flexible disk file with the disk rotating in a direction to traverse the access arm from the sharp edge towards the blunt edge, the transducing interface between the transducer and the rotating disk upon which data is transduced is relatively close. Stated another way, the oxide surface of a selected rotating disk is relatively close to the transducer. A more detailed discussion of the aforementioned blade is given in U.S. Pat. No. 3,975,769.

Although the above-described devices have improved accessibility to a target disk in a flexible disk file, these devices do not address the fail-safe aspect of a random access flexible disk storage system. Failsafe, as used herein, means that if an unusual condition or problem is generated during system operation then the splitting mechanism or the head arm support will operate so as to minimize damage to the disk and/or data loss.

There are several problem conditions which can develop during system operation which will result in damage to disk storage systems. Probably one common problem condition is power loss. The power loss condition is particularly devastating when the head is in the disk pack simultaneously with the power loss. As is well known to those skilled in the art, the opening in a flexible disk pack which allows a magnetic transducer to enter so as to transduce data from a selected track on a target disk, is generated and controlled by the rotational speed of the pack and/or air jets from a vacuum source. Generally the air jets which may be internal to the pack, are used for splitting the pack. When a flexible disk pack is rotating at its normal operational velocity, the surface of a target disk which interfaces the opening is relatively flat (that is free from waves and undulations). However, as the disk pack slows down and/or closes on the head arm, bow waves are generated in the surface of the target disk. The bow waves have the potential to interact with the head arm support and/or the transducer. Due to the fact that the disks are fragile, the interaction results in the head and/or head support arm tearing the disk.

In the situation where vacuum is lost, the pack will close on the head and head arm support. This condition also results in damage to the disk pack.

Another condition, which results in damage to the disks, occurs when the head arm support and transducer remain in a closed pack for a relatively long period of time. Under normal operating conditions the media or disk is flying relative to the head and head arm support. However, as the pack closes the head and head arm support are in physical contact with the surface of the disk. This condition generates heat and wear which damage the disk. The heat further erases magnetic data which is stored on the magnetic disk.

Another source of damage to a disk pack occurs when the head arm support and head are inserted into a closed pack or partially opened pack. Generally, the insertion and withdrawal of the head arm support is done by a positioning mechanism. The positioning mechanism is controlled by a servo loop. Controlled signals are generated which instruct the mechanism as to when to insert the head arm support. It is not unusual to have a control signal issued to the mechanism when, in fact, the disk pack is not opened. The force with which the head arm impacts the disks in the pack results in tearing the disk.

SUMMARY OF THE INVENTION

The aforementioned problems are solved by a fail-safe head arm support which allows for automatic ejection from the pack during inadvertent closure.

The fail-safe head arm support allows for the reduction of bow waves and, as a result, minimizes tearing of the disks.

The fail-safe head arm support can be inserted in a closed pack without undue damage to the pack.

The above fail-safe features are achieved by a head arm support design in accordance with the present invention. The head arm support is fabricated from an elongated member. The member is substantially flat with a sharp leading edge, and a relatively sharp front edge. One end of the member is adapted for mounting to the carriage of a positioning device, while the free end of the member is adapted for seating a head which transduces data on a target disk. The elongated member has a smooth surface with a tapered cross-sectional profile extending from the mounting end to the free end. The tapered profile forms a predetermined angle ($\theta$) with a line extending horizontally. The angle $\theta$ controls the rate at which the head arm support is automatically ejected from a closed pack. The larger the angle, the more effective the ejecting characteristic.

In one feature of the invention, the central section of the head arm support is selectively removed to leave voids. This design tends to lessen the mass of the head arm support.

In another feature of the invention, a spherical enclosure is fabricated on the free end of the head arm support. The head is mounted within the spherical enclosure.

In still another feature of the invention, the leading edge of the head arm support has a tapered cross-section.

In still another feature of the present invention, the leading edge of the head arm support has a concave cross-section.

In still another feature of the present invention, the leading edge of the head arm has a convex cross-section.

In still another feature of the present invention, the fail-safe head arm support is further characterized by a relatively sharp trailing edge. The foregoing and other features and advantages of the invention will be apparent from the following more particular description of preferred embodiments of the invention, as illustrated in the accompanying drawings.

DETAILED DESCRIPTION OF THE INVENTION

Figure 1:
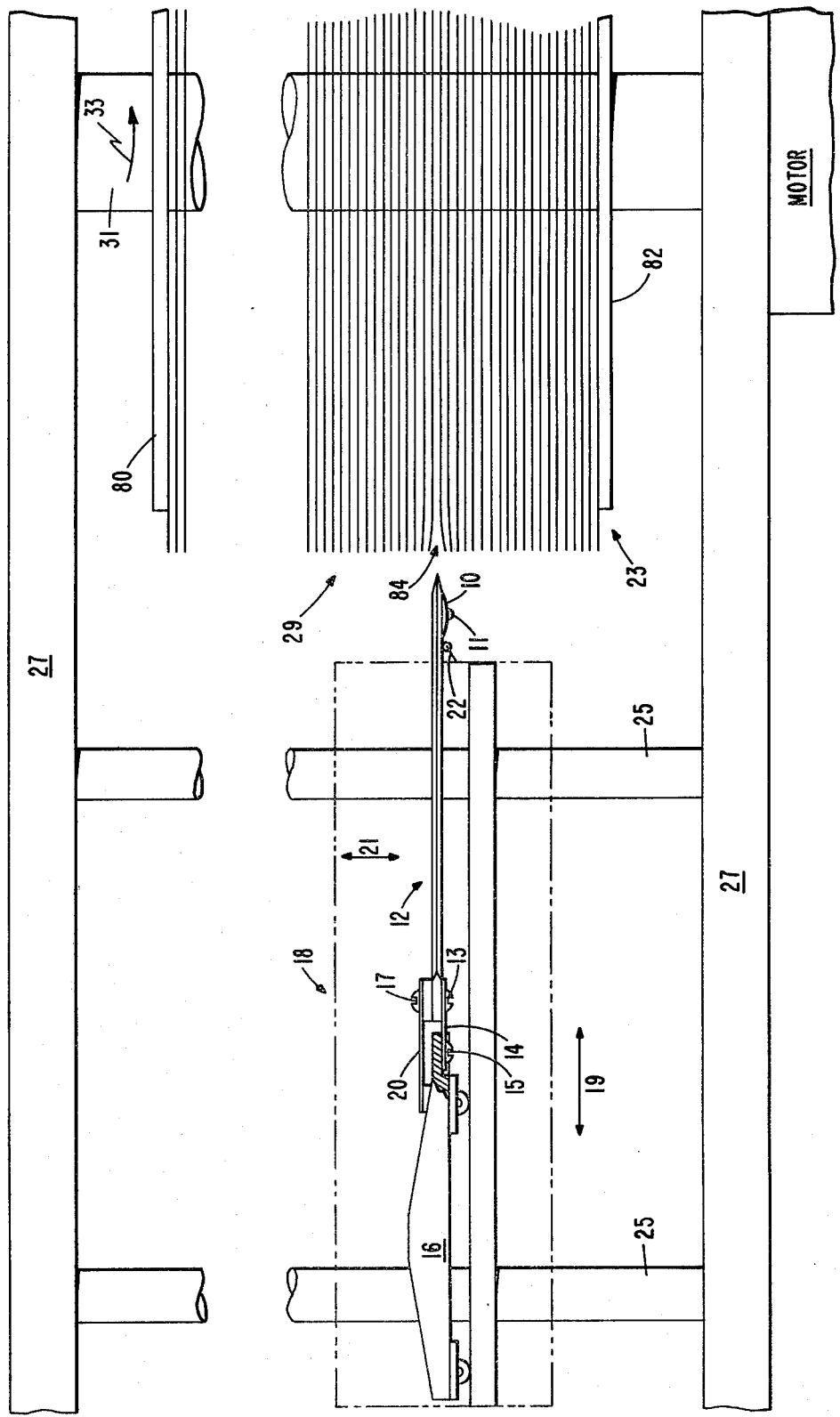
FIG. 1 is a side elevational view of a head arm support in accordance with the present invention. The head arm support is fixed to a positioning apparatus and in alignment with a flexible disk file storage system.

In describing the invention hereinafter, common elements in the drawings will be identified with the same numerals.

With reference to FIG. 1, a magnetic transducer 11 is mounted to a bulbous enclosure 10 of magnetic head support arm 12. The magnetic head support arm is hinged by flexible means 14 to carriage 16 of a positioning mechanism 18. The hinge may be a flexible member such as a leaf spring having one end firmly attached to the magnetic head support arm by first fastening means 13 and the other end firmly attached to the carriage assembly by second fastening means 15. Although a plurality of fastening means may be used, in the preferred embodiment of the invention the fastening means are screws.

The positioning mechanism, in turn, may be a conventional linear actuator or linear motor. Biasing means 20, which may be a leaf spring, is connected between the magnetic head support and the carriage assembly. One end of the biasing means is rigidly mounted by third fastening means 17 to the head arm support. The other end of the biasing means is free to slide in frictional engagement with a ramp surface on carriage 16. The biasing means exerts a force grams on the magnetic head arm support and, as a result, the attached transducer is positioned, with adequate load, within transducing distance to the oxide surface of a target disk in a disk pack. The hinge means and the biasing means allow the magnetic head support arm to be rigid and/or stiff in the direction shown by arrow 19, hereinafter called the radial direction, while the head support arm flexes or hinges in the direction shown by arrow 21, hereinafter called the axial direction. The positioning mechanism is slideable, mounted on a pair of spaced precision rods 25. The rods are journaled for rotation to a support frame. A drive mechanism (not shown) is connected to drive the positioning mechanism in the axial direction.

A flexible disk storage file 23 is mounted to the support frame in axial and radial alignment with the positioning means. The disk file includes a plurality of disks 29. The central section of each disk is clamped to spindle 31. The spindle is journaled to the support frame and is rotated by a drive motor in the direction shown by arrow 33. A pair of end plates 80 and 82 align the disks axially. As is well known in the art, the disk file may comprise a single disk.

Still referring to FIG. 1, as the disk file rotates opening 84 is generated in the pack between two adjacent disks. The opening is generated by conventional means such as an air jet. As the opening is generated, magnetic transducer 11 is transported in the radial direction by carriage 16 to transduce data on a selected track of a target disk. Likewise, the positioning mechanism is transported in the axial direction by the drive mechanism (not shown) to access a target disk.

Figure 2:
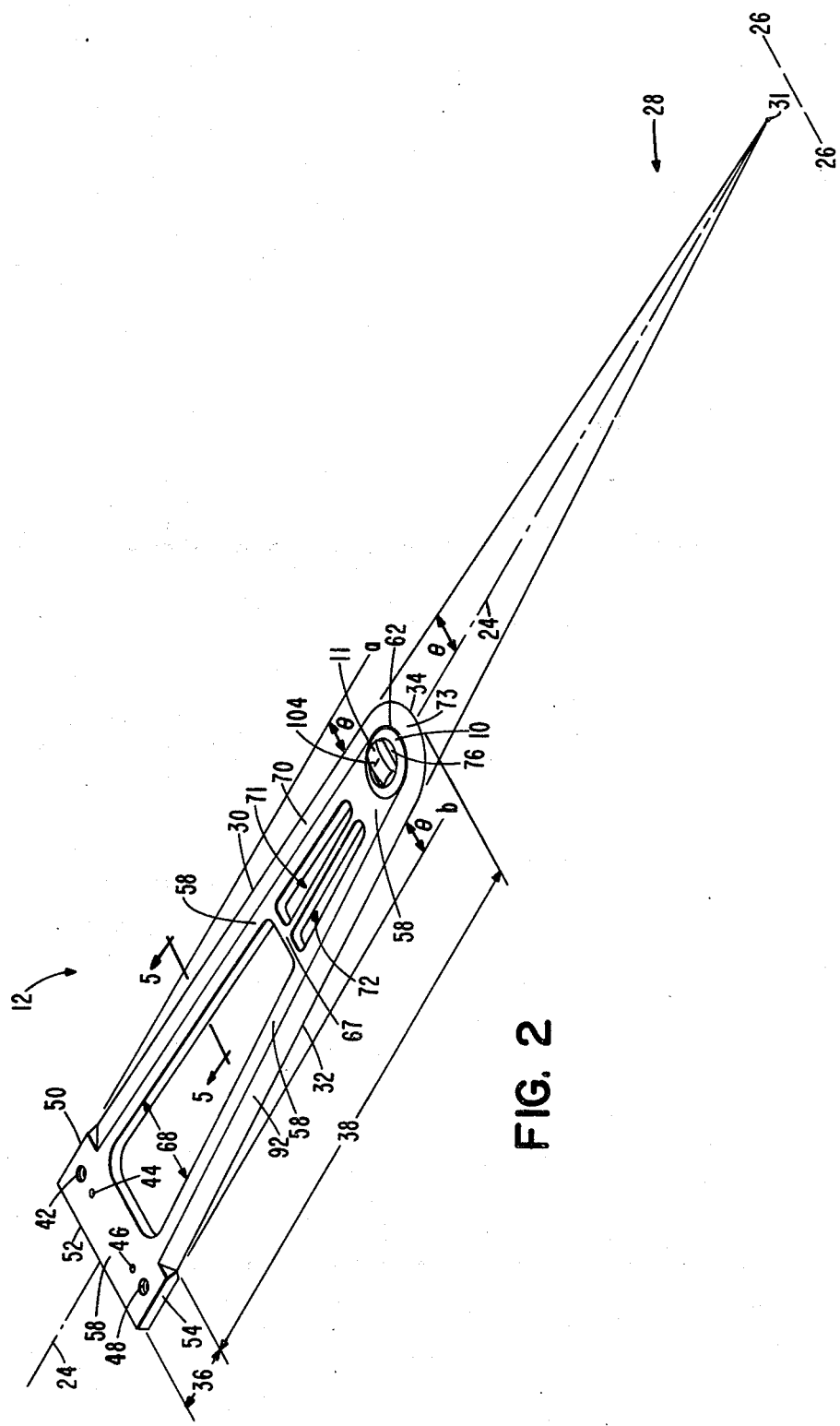
FIG. 2 depicts a bottom pictorial view of the head arm support and shows the geometrical relation between a rotating disk pack and the accessing head support arm. The relationship is helpful in defining the leading, trailing and front edge of the head arm support and the tapered angle theta ($\theta$) which gives the head arm the self ejecting characteristic.

Referring now to FIG. 2, the bottom surface of the magnetic head support arm is shown. Before discussing the details of the arm, its relationship relative to a rotating flexible disk storage will be explained. Magnetic head arm support 12 has a radial line of action 24 along which it is transported to position transducer 11, within transducing distance, with the oxide surface of a target disk in an open disk pack. The disk pack, which is not shown, has its center of rotation coincident with axis 26 and rotates in a direction shown by arrow 28. Of course, the disk pack (not shown in FIG. 2 but may be of the type shown in FIG. 1) may rotate in the direction opposite to arrow 28 and may be orientated in a horizontal or a vertical position.

As is used herein, the leading edge 30 of the magnetic head support apparatus is the edge which faces direction 28 of the rotating disks. Stated another way, the leading edge of the head arm support is that edge which a reference point position on a rotating disk would first encounter as the point traverses across the surface of the head arm support in the direction of disk rotation. The trailing edge 32 is that edge which is opposite to the leading edge. Conversely, if the disk's rotation was in a direction opposite to arrow 28 then trailing edge 32 would be the leading edge and leading edge 30 would be the trailing edge. The front edge 34 is the edge which interconnects the leading edge and the trailing edge.

Still referring to FIG. 2, the magnetic head arm support 12 is used for positioning a magnetic head into a flexible disk pack. The magnetic head arm support comprises a base section 36 and a working section 38. The base section is fabricated with a plurality of access holes 42, 44, 46 and 48, respectively. The accessing holes are used for attaching the biasing means and the hinge means to the carriage of the positioning mechanism. The base section is defined by sides 50, 52 and 54, respectively, which intersect at right angles to each other. Generically, the base section of the head support arm attaches to the carriage of the positioning mechanism. The working section 38 of the magnetic head support arm is that portion of the magnetic head support arm which is inserted into an opening generated in the disk pack. The working section includes flat surfaces 58 (FIG. 2) and 60 (FIG. 3) and head support section 62. The entire magnetic head support arm is relatively smooth and flat save for the head support section 62 which is a bulbous enclosure projecting above flat surface 58. As will be explained subsequently, the bulbous enclosure is used for enclosing the magnetic transducer which reads data from a selected track on a target disk.

Figure 3:
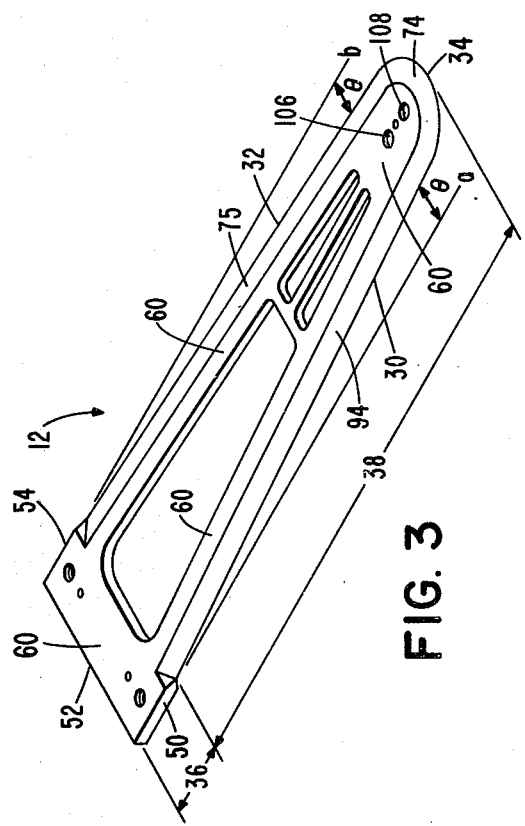
FIG. 3 is a top pictorial view of the head arm support.

As is evident from the underside view of the magnetic head support arm in FIG. 2 and the top side view of the magnetic head support arm in FIG. 3, portions of the head support arm are removed to leave voids or openings identified as 68, 71 and 72, respectively. The voids reduce the mass of the head support arm.

In an alternate embodiment of the invention, surfaces 58 (FIG. 2) and 60 (FIG. 3) are one continuous surface without voids or openings. As a result of the flatness and smoothness of the head arm support, the opening which is generated for the working section of the head arm support is relatively narrow. Although the dynamics of a flexible disk pack are complicated, it is believed that there is a relative dependency between the size of the opening and the amplitude of the bow waves which are generated when the pack inadvertently slows down and/or closes. It was observed that the smaller the opening, the smaller the crest of the bow wave which results in less damage to the media. To this end, the thinness of the magnetic head support arm significantly reduces the bow waves which are generated as a result of a power loss or a slowing down and the ultimate closing of the disk pack about the head arm support.

Still referring to FIGS. 2 and 3, the head arm support is further characterized by a relatively sharp leading edge 30. Leading edge 30, although relatively sharp, has a relatively small radius within the range of from 5 to 10 mils on the apex of the edge. With this small radius, the edge 30, although relatively sharp, is not sharp enough to cut or damage the flexible rotating disk. The edge 30 is elongated and extends from the base section to the vicinity of the bulbous enclosure. Trailing edge 32, having the same characteristics as leading edge 30, is positioned at the opposite side of the head arm support. It is worthwhile noting that trailing edge 32 need not have the same characteristic as leading edge 30, for example, the trailing edge may be blunt. Leading edge 30 is inclined at an angle ($\theta$) to a horizontal line "a." One of the unique characteristics of the magnetic head support arm is that if it is inserted in a flexible disk file and due to inadvertent error the pack closes, as the flexible disk file contacts the head arm, the arm is automatically ejected from the pack without damaging adjacent flexible disks. It was determined that the angle theta ($\theta$) at which the leading edge tapers from the base section towards front edge 34 controls the speed and/or effectiveness of ejecting the head and the head arm assembly from the pack. Specifically, it was determined that the greater the angle theta ($\theta$), the more likely and more rapid will the head arm be ejected from the closed pack. In a preferred embodiment, the head arm has its most effective ejection when the theta ($\theta$) is equivalent to 45°.

Similar to the leading edge, in the preferred embodiment of the invention, trailing edge 32 is also inclined at an angle ($\theta$) relative to a horizontal reference line "b." Trailing edge 32 abuts and is contiguous with the front edge. Trailing edge 32 is elongated and has characteristics substantially equivalent to the characteristics described for leading edge 30. Of course, it should be noted that if the disk pack is rotating in a direction opposite to the direction of arrow 28, then trailing edge 32 becomes the leading edge. Still referring to FIG. 2, since the angle theta ($\theta$) is that angle which is formed between radial line 24 of the magnetic head arm support and its tapered leading edge 30, the apex of said angle which falls on the radial line, for example, at point 31, precedes the front edge of the magnetic head support arm as it enters in the rotating flexible disk file. Conversely, the apex of said angle follows the front edge of the magnetic head arm support as it recedes from the disk file.

Another method of defining the ejection angle theta ($\theta$) is to define said angle relative to the radial line of action of the magnetic head support arm. As was stated previously, radial line 24 (FIG. 2) is the line along which the magnetic transducer is moved in and out of the flexible disk pack. The angle theta ($\theta$) may be defined as the angle between the radial line 24 and the leading edge 30.

Adjoining to, and contiguous with elongated leading edge 30, is front edge 34. Front edge 34 has a relatively sharp profile substantially equivalent to the profile on leading edge 30 and operates to allow the head arm to enter into a closed pack without damaging said pack.

Although there may be a plurality of ways to fabricate the magnetic head support arm without departing from the scope of the present invention, in the preferred embodiment of this invention, the arm is machined from a single piece of metal. The internal section of the head support arm may be removed to leave a complete void or partially removed to leave a T-bar section 67. The main reason for removing the internal portion is to reduce the mass of the head support arm. In an attempt to strengthen the arm so as to maintain relatively rigid support for the magnetic head, the T-bar pattern is fabricated towards the tapered end of the magnetic head support arm. The T-bar section acts as a cam surface. The T-bar section co-acts with cam follower 22 (FIG. 1) to control the landing of the transducer relative to the oxide surface of a target disk.

Figure 5:
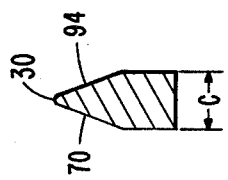
FIG. 5 shows a cross-section along line 5—5 of FIG. 2.

Referring now to FIG. 5, a section taken along line 5—5 is shown. A section taken across trailing edge 32 is substantially identical to the section taken along line 5—5 and, therefore, only the section taken along line 5—5 will be discussed. Also, the relative sharpness of front edge 34 is substantially equivalent to the sharpness of leading edge 30. In FIG. 5, leading edge 30 is formed by beveled surfaces 70 and 94 respectively. The beveled surfaces taper from flat surfaces 58 and 60, respectively, towards the sharp edges of the head support arm. In the preferred embodiment, the beveled surfaces taper at a 20° angle relative to a horizontal line which may coincide with flat surfaces 60 and 58, respectively. The metal which forms the magnetic head support arm has a thickness "C." In the preferred embodiment of the invention, "C" is substantially equivalent to 0.095 inches. This thickness is sufficient to generate an opening in the pack which minimizes bow waves and allows a transducer to access a selected track. Still referring to FIG. 5, the leading edge 30 is formed by surfaces 70 and 94 which taper from the flat surfaces to form the relatively sharp leading edge. Likewise, the relatively sharp front edge is generated by surfaces 74 and 73 (FIGS. 2 and 3), respectively. Surfaces 73 and 74 taper from the periphery of the bulbous enclosure situated next to the front edge to form the relatively sharp front edge. In a similar manner, the relatively sharp trailing edge is formed by tapering surfaces 92 and 94, respectively.

Figure 4B:
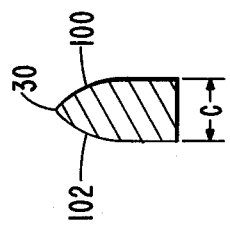
FIGS. 4A–4B show geometrical configuration for the leading edge of the head arm support.
Figure 4A:
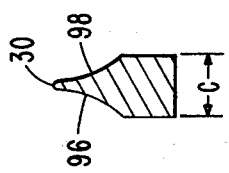

In FIG. 4A, an alternative geometry for leading edge 30 is shown. In this configuration, surfaces 96 and 98 are concave. However, the thickness "C" of the magnetic head support arm remains the same.

Likewise, in FIG. 4B, still another alternative geometry is shown for leading edge 30. In this configuration, surfaces 100 and 102 are convex.

Referring again to FIG. 2, bulbous enclosure 10 is fabricated on the head support section 62 of the magnetic head support arm. The bulbous enclosure abuts the front edge of the magnetic head support arm. In the preferred embodiment of the invention, the bulbous enclosure has a spherical profile which surrounds a depressed section 76. The depressed section is used to mount a transducer 11. The transducer is fitted with transducing gap 104. The spherical geometry on the enclosure helps to eject the magnetic head support arm with greater force should the disk pack attempt to close on the head. Additionally, if the transducer has protruding and/or edges, then the spherical configuration prevents the corners from damaging the flexible disk. The transducer may be fixed to the depressed section by adhesive. However, in the preferred embodiment of this invention, screws are used in holes 106 and 108, respectively, (FIG. 3) to attach the transducer.

OPERATION

In operation the magnetic head support arm 12 is mounted by its base section to the carriage 16 of the linear actuator via the flexure means (hinge 14) and the biasing means 20. The free end, which has the bulbous enclosure 10 on its under surface, is cantilevered from the base section. A magnetic transducer 11 is seated in the bulbous enclosure and is fastened to said enclosure through mounting holes. The magnetic head support arm 12 with its actuator is then inserted in the opening 84 which is generated in a rotating flexible disk file system. Due to the relative thinness and smoothness of the head support arm, the opening which is maintained in the disk pack is relatively narrow. This, in turn, reduces bow waves which may be formed due to a slowing down of the rotating system and/or closing of the pack on the head arm support. Also, should the disk pack close while the head arm is inserted in the pack, then due to the angle theta ($\theta$) and the interfacing disk contacting the head arm, the arm is automatically ejected from the pack.

Finally, if the actuator attempts to force the magnetic head support arm into a fully closed or partially open pack, then the sharp leading edge of the support arm will open the pack and enter without damage to the disk.

It should be understood that the dimensions mentioned above, including dimensions ($\theta$) and C, are given for purposes of example only and may well be varied within the scope of the invention.

While the invention has been particularly shown and described with reference to preferred embodiments thereof, it will be understood by those skilled in the art that various changes in form and details may be made therein without departing from the spirit and scope of the invention:

What is claimed is:

1. In a disk storage file including a plurality of flexible disks mounted for rotation about a central axis and a positioning mechanism which positions a transducer into a pack opening along a radial line transverse to circumferential data tracks to read and/or write data formed in the data tracks on a surface of the flexible disks, an improved head support arm for the transducer comprising, in combination, a relatively thin and planar member elongated along said radial line having a closed, continuous and uniformly tapered relatively sharp edge contour formed about a majority portion of its periphery including a front edge, a leading edge and a trailing edge which are symmetrically disposed and inclined at an angle with respect to said radial line with an apex formed by said leading and trailing edges preceding the front edge, said angle and edges cooperating to eject the head support arm automatically from within the magnetic disk pack in the event the pack opening in the flexible rotating disks dissipates.

2. The device as claimed in claim 1 wherein the sharp edge has a double tapered cross-section.

3. The device as claimed in claim 1 wherein the sharp edge is formed with a concave cross-section.

4. The device as claimed in claim 1 wherein the sharp edge is formed by a convex cross-section.

* * * * *